US011502537B2

(12) United States Patent
Eckert

(10) Patent No.: US 11,502,537 B2
(45) Date of Patent: Nov. 15, 2022

(54) CHARGING DEVICE AND METHOD FOR OPERATING A CHARGING DEVICE

(71) Applicant: Robert Bosch GmbH, Stuttgart (DE)

(72) Inventor: Bernd Eckert, Vaihingen An Der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 16/484,583

(22) PCT Filed: Feb. 1, 2018

(86) PCT No.: PCT/EP2018/052520
§ 371 (c)(1),
(2) Date: Sep. 16, 2019

(87) PCT Pub. No.: WO2018/145991
PCT Pub. Date: Aug. 16, 2018

(65) Prior Publication Data
US 2020/0006976 A1    Jan. 2, 2020

(30) Foreign Application Priority Data

Feb. 10, 2017  (DE) .................... 10 2017 202 158.6

(51) Int. Cl.
*H02J 50/40* (2016.01)
*H02J 7/02* (2016.01)
(Continued)

(52) U.S. Cl.
CPC .......... *H02J 7/025* (2013.01); *H02J 7/00043* (2020.01); *H02J 7/0044* (2013.01); *H02J 50/12* (2016.02); *H02J 50/40* (2016.02)

(58) Field of Classification Search
CPC .. H02J 7/025; H02J 50/12; H02J 50/40; H02J 7/00043; H02J 7/0044; H02J 7/00047
See application file for complete search history.

(56) References Cited

U.S. PATENT DOCUMENTS

2007/0279002 A1    12/2007  Partovi
2014/0143933 A1*   5/2014   Low ..................... H02J 7/0042
                                                          320/108
(Continued)

FOREIGN PATENT DOCUMENTS

DE        102013226251       6/2014
EP           1986304 A2     10/2008
WO        2007089086 A1      8/2007

OTHER PUBLICATIONS

International Search Report dated Apr. 20, 2018 of the corresponding International Application PCT/EP2018/052504 filed Feb. 1, 2018.

*Primary Examiner* — Nghia M Doan
(74) *Attorney, Agent, or Firm* — Norton Rose Fulbright US LLP; Gerard Messina

(57) ABSTRACT

A charging device, in particular for machine tools, including a charging unit which in at least one operating state is provided for contactlessly charging at least one rechargeable battery unit, and which includes at least a first charging operating mode for transmitting electrical energy. The charging unit includes at least a second charging operating mode for transmitting electrical energy, the second charging operating mode differing from the first charging operating mode in at least one charging parameter.

10 Claims, 3 Drawing Sheets

(51) Int. Cl.
*H02J 50/12* (2016.01)
*H02J 7/00* (2006.01)

(56) References Cited

U.S. PATENT DOCUMENTS

| | | |
|---|---|---|
| 2014/0152115 A1 | 6/2014 | Wheeland et al. |
| 2014/0191568 A1 | 7/2014 | Partovi |
| 2014/0197687 A1 | 7/2014 | Lin |
| 2014/0210406 A1* | 7/2014 | Na .................. H01F 38/14 |
| | | 320/108 |
| 2015/0022194 A1 | 1/2015 | Almalki et al. |
| 2015/0270740 A1* | 9/2015 | Lee .................. H02J 50/40 |
| | | 320/108 |
| 2016/0285278 A1* | 9/2016 | Mehas ............... H02J 50/12 |
| 2018/0175672 A1* | 6/2018 | Yoden ............... H02J 50/40 |
| 2019/0165610 A1* | 5/2019 | Hong ................ H02J 50/12 |

* cited by examiner

CHARGING DEVICE AND METHOD FOR OPERATING A CHARGING DEVICE

FIELD OF THE INVENTION

The present invention relates to a charging device and a method for operating a charging device.

BACKGROUND INFORMATION

Wireless charging devices that include an inductive charging unit which is provided for inductively charging a rechargeable battery unit are known from the related art. However, the wireless charging devices are limited to one charging operating mode. The wireless charging devices on the one hand are assigned to a defined power class, for example 5 W or 3 kW, and on the other hand may transmit electrical energy either continuously or intermittently.

SUMMARY OF THE INVENTION

The present invention is directed to a charging device, in particular for machine tools and advantageously for handheld power tools, including a charging unit which in at least one operating state, in particular for a charging operation, is provided for contactlessly charging at least one rechargeable battery unit, and including at least an advantageously predefined first charging operating mode for an in particular contactless transmission of electrical energy.

It is provided that the charging unit includes at least an advantageously predefined second charging operating mode for what may be a contactless transmission of electrical energy, the second charging operating mode differing from the first charging operating mode in at least one charging parameter. An advantageously high level of flexibility may be achieved by this configuration of the charging device. In addition, advantageous interoperability may be achieved. Moreover, the charging device and/or a charging duration may advantageously be adapted to different user requirements, and/or an advantageously universally usable charging device may be provided. Furthermore, costs may be reduced and/or operating reliability may be improved in an advantageous manner.

In the present context, "charging device" is understood in particular to mean at least a portion and/or a submodule of a system, in particular an energy transmission system, and advantageously an inductive charging system. The charging device may be different from a vehicle charging device for contactless charging of a vehicle. The system includes in particular the charging device and at least one rechargeable battery unit, which may be for a machine tool and particularly may be for a hand-held power tool, and is at least provided for transmitting, in at least one operating state, energy, in particular electrical energy, in particular from the charging device to the at least one rechargeable battery unit. In particular, the system is provided for a contactless, advantageously inductive, transmission of the energy. The energy transmission may take place in particular over distances from a few millimeters, in particular less than 0.1 mm, to several centimeters, in particular greater than 10 cm. The system may particularly advantageously include a plurality of rechargeable battery units having different configurations that are provided for use with the charging device. In the present context, "rechargeable battery units having different configurations" is understood in particular to mean rechargeable battery units that differ, at least in part, in their operating principle, their typical application, their internal configuration, and/or their dimensions. The rechargeable battery units could be provided for use with different machine tools, for example from different manufacturers and/or with different power levels. Alternatively or additionally, at least one of the rechargeable battery units could be provided for use with a machine tool, while another of the rechargeable battery units could be provided for use with a notebook and/or smart phone. "Provided" is understood in particular to mean specially configured and/or equipped. Providing an object for a certain function is understood in particular to mean that the object meets and/or carries out this certain function in at least one use state and/or operating state.

In addition, a "charging unit" is understood in particular to mean an advantageously mobile and/or portable unit that is provided for making available electrical energy, in particular for contactlessly charging the at least one rechargeable battery unit. The charging unit may be configured as an inductive charging unit and includes in particular at least one energy transmission unit, advantageously an inductive charging coil, that is advantageously configured as an electrical oscillating circuit, and that is provided in particular for transmitting energy to the rechargeable battery unit, in particular during contactless charging. The charging unit may be configured, for example, as a charging device, as a charging cradle, as a charging plate, and/or as a charging mat, and/or as part of a charging device, as part of a charging cradle, as part of a charging plate, and/or as part of a charging mat. In addition, a "charging operating mode" is understood to mean an operating mode that includes at least one, in particular selectable and/or settable, charging parameter and that is used for in particular contactlessly transmitting electrical energy to a rechargeable battery unit. In particular, the first charging operating mode is associated with a first charging operation, and the second charging operating mode is associated with a second charging operation that is advantageously time-delayed with respect to the first charging operation. The first charging operation and the second charging operation thus advantageously take place in succession, and in particular not simultaneously. In addition, the first charging operating mode and the second charging operating mode could in particular be provided for an advantageously contactless and in particular time-delayed transmission of electrical energy to the same rechargeable battery unit. In this case, the first charging operating mode could be configured, for example, as a conservation charging mode and/or a particularly efficient charging mode, while the second charging operating mode could be configured as a quick-charging mode. However, the first charging operating mode may be provided for an advantageously contactless transmission of electrical energy to a first rechargeable battery unit, and the second charging operating mode, for an advantageously contactless transmission of electrical energy to a second rechargeable battery unit having a different configuration from the first rechargeable battery unit. In addition, a "charging parameter" is understood in particular to mean an advantageously settable and/or adaptable parameter that is correlated with the charging operating mode and which may be with a rechargeable battery unit to be charged, for example a type of energy transmission, a charging power, a charging duration, and/or a maximum temperature of the charging unit and/or of the rechargeable battery unit.

Furthermore, the charging device and advantageously the charging unit may include at least one control electronics system, in particular for controlling an operation of the charging unit, in particular for controlling the energy transmission unit and/or for setting the charging operating modes.

A "control electronics system" is understood in particular to mean an electrical and/or electronic unit that in particular includes an information input, an information processor, and an information output. The control electronics system advantageously includes at least a processor, a memory, an operating program, regulation routines, control routines, and/or computation routines.

Moreover, it is provided that the charging parameter is a type of energy transmission, in particular a continuous energy transmission and/or an intermittent energy transmission. A charging device may thus advantageously be provided that is adaptable to various rechargeable battery units and that may advantageously be operated continuously as well as intermittently. In particular, in this case the charging unit in one charging operating mode is provided for a continuous transmission of electrical energy, and in another charging operating mode is provided for an intermittent transmission of electrical energy. Alternatively or additionally, the charging unit may be provided in at least one charging operating state for a pulsed transmission of electrical energy. The control electronics system is advantageously provided for controlling the energy transmission unit in the charging operating mode in such a way that the energy transmission unit is provided for a continuous transmission of electrical energy. In addition, the control electronics system is advantageously provided for controlling the energy transmission unit in the further charging operating mode in such a way that the energy transmission unit is provided for an intermittent transmission of electrical energy.

In another embodiment of the present invention, it is provided that the charging parameter is a charging power. A charging device may thus advantageously be provided that is adaptable to different power classes. In this case the charging parameter may be freely settable at least in a power interval between 1 mW and 150 kW, which may be between 100 mW and 3 kW, and particularly between 1 W and 1 kW. In particular, in this case the charging unit in one charging operating mode is provided for a transmission of electrical energy at a first power, and in another charging operating mode, for a transmission of electrical energy at a second power that is different from the first power.

The charging unit could, for example, include at least two separate energy transmission units, advantageously inductive charging coils, each of which is provided for making available exactly one charging power. However, an advantageously compact and/or flexible charging device may be achieved in particular when the charging unit includes at least one, advantageously exactly one, energy transmission unit, in particular the above-mentioned energy transmission unit, which is provided for making available at least two, which may be at least four, advantageously at least eight, and particularly advantageously at least sixteen, different charging powers, particularly advantageously between 1 W and 1 kW.

The energy transmission unit, in particular for providing at least two, which may be at least four, advantageously at least eight, and particularly advantageously at least sixteen, different charging powers, which may be includes at least one coil unit configured as a broadband coil and/or multiple, in particular at least two, which may be at least three, and particularly at least four, which may be individually interconnectable coil elements. In particular, an advantageously broad power spectrum may be covered in this way. In particular, in the latter case the charging device may also include a switching unit that is in particular in operative connection with the control electronics system, and that is provided, as a function of a control of the control electronics system, for connecting the coil elements, in particular as a function of a set and/or requested charging power.

It is particularly advantageously provided that the charging unit includes at least four, which may be at least six, and particularly advantageously at least eight, different charging operating modes that differ in particular in at least one charging parameter, which may be a type of energy transmission and a charging power, as the result of which in particular a particularly high level of the versatility of the charging device may be achieved.

In addition, it is provided that the charging unit includes a control electronics system, in particular the above-mentioned control electronics system, that is provided for advantageously automatically setting one of the charging operating modes, based on at least one rechargeable battery parameter. A "rechargeable battery parameter" is understood in particular to mean a parameter that is correlated in particular with the rechargeable battery unit and/or is provided by the rechargeable battery unit. The control electronics system, at least based on the rechargeable battery parameter, may advantageously deduce the type of rechargeable battery unit and/or ascertain the type of rechargeable battery unit. The rechargeable battery parameter advantageously corresponds to at least one piece of identifying information about the battery unit, for example a weight of the rechargeable battery unit, a shape of the rechargeable battery unit, an identification signal of the rechargeable battery unit that is generated, for example, by an RFID chip, and/or an identification code of the rechargeable battery unit, in particular in the form of a serial number, an identification number, a model number, a bar code, and/or a QR code. In this way, in particular an advantageously simple adaptation of a charging operating mode to a rechargeable battery unit to be charged may be achieved.

The charging unit could in particular include a manually operable input unit, for example at least one switch, at least one pushbutton, and/or a touch display, that is provided in particular for inputting the rechargeable battery parameter and/or for manually setting and/or selecting one of the charging operating modes. Alternatively or additionally, however, it is provided that the charging device includes a detection unit that is provided for detecting, in particular automatically, at least one rechargeable battery parameter of a rechargeable battery unit to be charged, in particular the above-mentioned rechargeable battery parameter, and in particular for setting the charging operating mode to transmit to the control electronics system. In this way, in particular the operating reliability may be increased and/or operating convenience may be improved. In this context, a "detection unit" is understood in particular to mean a unit, which may be in operative connection with the charging unit, and advantageously at least partially and which may be at least to a large extent situated within the charging unit and/or integrated into the charging unit, which is provided in particular at least for detecting the rechargeable battery parameter and/or the rechargeable battery unit. In particular, for this purpose the detection unit includes at least one, which may be mechanical, capacitive, resistive, haptic, electrical, electromagnetic, acoustic, and/or which may be optical, detection element which may advantageously be configured as a passive and/or active sensor. The detection element may be configured as a laser scanner, as a CCD sensor, and/or as a camera. The term "at least to a large extent" is understood in particular to mean at least 55%, advantageously at least 65%, which may be at least 75%, particularly at least 85%, and particularly advantageously at least 95%.

Moreover, the present invention relates to a system, in particular an energy transmission system, including the above-mentioned charging device and at least one rechargeable battery unit that is provided for a contactless charging with the aid of the charging unit. The system may also include at least one further rechargeable battery unit, having a different configuration from the rechargeable battery unit, that is provided for a contactless charging with the aid of the charging unit. In particular, the charging unit in the first charging operating mode is provided for a contactless charging of the rechargeable battery unit, and in the second charging operating mode is provided for contactless charging of the further rechargeable battery unit. In particular an advantageously high level of flexibility may be achieved in this way. In addition, advantageous interoperability may be achieved. Moreover, the charging device may be advantageously adapted to different user requirements, and/or an advantageously universally usable charging device may be provided. Furthermore, costs may be reduced and/or operating reliability may be improved in an advantageous manner.

Moreover, the present invention relates to a method for operating the above-mentioned charging device, one of the charging operating modes being set and/or selected in at least one method step, based on at least one rechargeable battery parameter of the rechargeable battery unit, and the rechargeable battery unit being contactlessly charged with the aid of the charging unit in at least one further method step, in particular subsequent to the method step. In particular an advantageously high level of flexibility may be achieved in this way. In addition, advantageous interoperability may be achieved. Moreover, the charging device and/or a charging duration may be advantageously adapted to different user requirements, and/or an advantageously universally usable charging device may be provided. Furthermore, costs may be reduced and/or operating reliability may be improved in an advantageous manner.

The charging device is not intended to be limited to the use and specific embodiment described above. In particular, for implementing an operating principle described herein, the charging device may include a number of individual elements, components, and units that is different from a number stated herein.

Further advantages result from the following description of the drawings. Two exemplary embodiments of the present invention are illustrated in the drawings. The drawings, the description, and the claims contain numerous features in combination. Those skilled in the art will also advantageously consider the features individually and combine them into further meaningful combinations.

DETAILED DESCRIPTION

Figure 1:
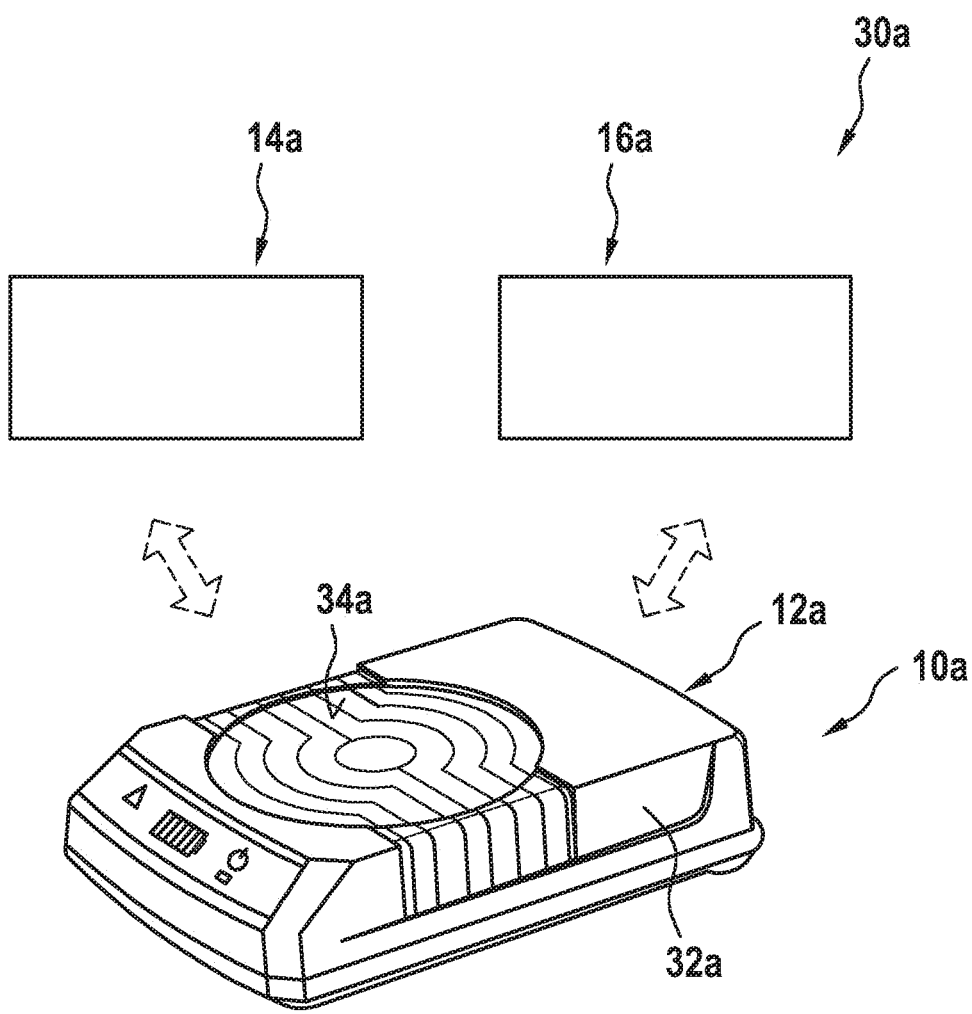
FIG. 1 shows a system that includes a charging device and two schematically illustrated rechargeable battery units, having different configurations, in a perspective illustration.

FIG. 1 shows a system $30a$, configured as an energy transmission system by way of example, in a perspective illustration. In the present case, system $30a$ is configured as an inductive charging system, in particular for power tools, and is provided for a contactless transmission of electrical energy. System $30a$ includes a charging device $10a$. In addition, in the present case system $30a$ includes two rechargeable battery units $14a$, $16a$ by way of example, which are provided for use with charging device $10a$. Alternatively, however, a system could also include one rechargeable battery unit and/or a plurality of rechargeable battery units, for example at least four, at least six, at least eight, and/or at least ten rechargeable battery units.

Charging device $10a$ includes a charging unit $12a$. Charging unit $12a$ is separate from rechargeable battery units $14a$, $16a$.

Charging unit $12a$ is configured as a charging plate. Charging unit $12a$ is configured as an inductive charging unit.

Charging unit $12a$ includes a charging housing $32a$. Charging housing $32a$ is configured as an outer housing. Charging housing $32a$ includes an at least essentially flat receiving surface $34a$, in particular for standing and/or laying rechargeable battery units $14a$, $16a$, in particular during a charging operation.

Figure 2:
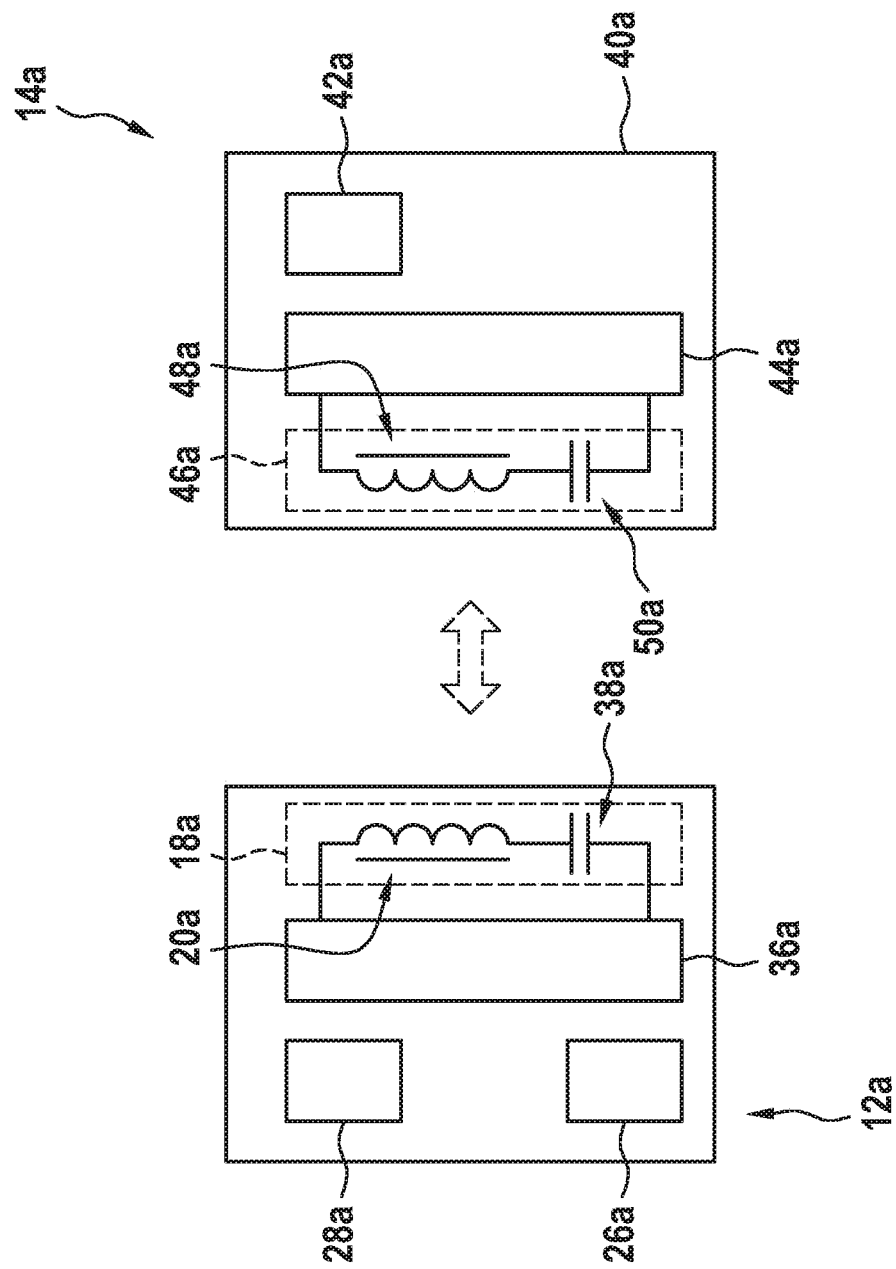
FIG. 2 shows a schematic illustration of an internal configuration of the charging device and of one of the rechargeable battery units.

Charging unit $12a$ also includes a control electronics system $26a$ (cf. FIG. 2). Control electronics system $26a$ is integrated into charging housing $32a$. Control electronics system $26a$ is used for controlling an operation of charging unit $12a$. For this purpose, control electronics system $26a$ includes a memory unit with an operating program stored therein, and a processing unit that is provided for executing the operating program.

Charging unit $12a$ is provided for contactlessly charging rechargeable battery units $14a$, $16a$. In the present case, charging unit $12a$ is provided for charging rechargeable battery units $14a$, $16a$ with the aid of an advantageously resonant, inductive coupling.

For this purpose, charging unit $12a$ includes a power electronics system $36a$ (cf. FIG. 2). Power electronics system $36a$ is situated within charging housing $32a$. In the present case, power electronics system $36a$ is configured as an inverter and is provided for converting a rectified voltage of an energy source into a high-frequency current and providing it at an output of power electronics system $36a$.

In addition, charging unit $12a$ includes an energy transmission unit $18a$. Energy transmission unit $18a$ is situated in an upper area of charging unit $12a$ and/or on a side of charging unit $12a$ facing receiving surface $34a$. Energy transmission unit $18a$ has an electrical connection with power electronics system $36a$, in particular the output of power electronics system $36a$. Energy transmission unit $18a$ is configured as an electrical resonant circuit. Energy transmission unit $18a$ includes a coil unit $20a$. In the present case, coil unit $20a$ is configured as a broadband coil. In addition, energy transmission unit $18a$ includes a capacitor $38a$ that in particular is connected in series to coil unit $20a$. Energy transmission unit $18a$ is provided for making available electrical energy, in particular for contactlessly charging rechargeable battery units $14a$, $16a$. In the present case, energy transmission unit $18a$ is provided, in particular with the aid of coil unit $20a$, for providing multiple different charging powers, in the present case in particular in a power interval between 1 W and 1 kW. Alternatively, an energy transmission unit could also include multiple coil units, coil elements, capacitors, and/or other components. In addition, an energy transmission unit could be provided for making available charging powers between 1 mW and 150 kW. Furthermore, an energy transmission unit, in particular with the aid of a coil unit, in principle could also be provided for making available one charging power or at least four, at least eight, and/or at least sixteen, different charging powers.

Rechargeable battery units 14a, 16a are provided for contactless charging with the aid of charging unit 12a. Rechargeable battery units 14a, 16a have different configurations, and differ from one another in at least one feature, in the present case, for example, a maximum charging power and a required type of energy transmission. In the present case, one rechargeable battery unit 14a of rechargeable battery units 14a, 16a is provided, for example, for use with a machine tool, in particular a hand-held power tool, while another rechargeable battery unit 16a of rechargeable battery units 14a, 16a is provided for use with a notebook. Alternatively, however, all rechargeable battery units could be provided for use with machine tools. In addition, rechargeable battery units having different configurations could differ from one another solely in a charging power or a required type of energy transmission.

Rechargeable battery units 14a, 16a have an at least essentially identical internal configuration. For this reason, the following description concerning the internal configuration of rechargeable battery units 14a, 16a is limited to rechargeable battery unit 14a; however, the following description may also be applied to other rechargeable battery unit 16a.

FIG. 2 shows the internal configuration of rechargeable battery unit 14a. Rechargeable battery unit 14a is separate from charging device 10a. Rechargeable battery unit 14a is configured as a rechargeable battery pack. Rechargeable battery unit 14a is configured as an inductively chargeable rechargeable battery unit.

Rechargeable battery unit 14a includes a rechargeable battery housing 40a. Rechargeable battery housing 40 is configured as an outer housing. Rechargeable battery housing 40 is provided for standing and/or laying on receiving surface 34a, in particular during a charging operation.

Rechargeable battery unit 14a also includes a further control electronics system 42a. Further control electronics system 42a is integrated into rechargeable battery housing 40a. Further control electronics system 42a is used for controlling an operation of rechargeable battery unit 14a. For this purpose, further control electronics system 42a includes a further memory unit with a further operating program stored therein, and a further processing unit that is provided for executing the further operating program.

Rechargeable battery unit 14a also includes an energy store 44a. Energy store 44a is situated within rechargeable battery housing 40a. Energy store 44a is rechargeable. Energy store 44a includes rechargeable battery cells. Energy store 44a is provided for storing electrical energy, and providing it in particular to an electrical and/or electronic device that is coupleable to rechargeable battery unit 14a.

In addition, rechargeable battery unit 14a includes an energy receiver unit 46a. Energy receiver unit 46a is situated within rechargeable battery housing 40a. Energy receiver unit 46a is situated in a lower area of rechargeable battery unit 14a and/or on a side of rechargeable battery unit 14a facing receiving surface 34a. Energy receiver unit 46a has an electrical connection with energy store 44a. Energy receiver unit 46a is configured as an electrical resonant circuit. Energy receiver unit 46a includes a further coil unit 48a, and a further capacitor 50a that in particular is connected in series to further coil unit 48a. Energy receiver unit 46a is provided for receiving electrical energy from charging unit 12a, in particular energy transmission unit 18a, and transmitting it to energy store 44a. Alternatively, an energy receiver unit could also include multiple further coil units, coil elements, capacitors, and/or other components.

In particular for contactless charging of rechargeable battery units 14a, 16a with the same charging device 10a, charging unit 12a includes multiple different charging operating modes. Each of the charging operating modes is used for contactlessly transmitting electrical energy to one of rechargeable battery units 14a, 16a. The charging operating modes each differ from one another in at least one charging parameter. In the present case, charging unit 12a by way of example includes four different charging operating modes that differ from one another in two different charging parameters. A first charging parameter of the charging parameters is a type of energy transmission, in particular a continuous energy transmission and/or an intermittent energy transmission. A second charging parameter of the charging parameters is a charging power. The charging power is variable, in the present case in particular in a power interval between 1 W and 1 kW, with the aid of energy transmission unit 18a, in particular coil unit 20a. In the present case, charging device 10a may thus operate continuously with varying charging powers as well as intermittently with varying charging powers. Alternatively, a charging unit could also include exactly two different charging operating modes or at least ten different charging operating modes. In addition, charging operating modes could differ from one another solely in a charging power or a type of energy transmission. In addition, charging powers could also be variable between 1 mW and 150 kW.

In the present case, a first charging operating mode of the charging operating modes is provided for a contactless transmission of electrical energy to rechargeable battery unit 14a. Control electronics system 26a is provided for controlling energy transmission unit 18a, in particular in a clocked manner, in such a way that energy transmission unit 18a is provided for an intermittent transmission of electrical energy at a charging power of approximately 54 W.

In addition, a second charging operating mode of the charging operating modes is provided for a contactless transmission of electrical energy to further rechargeable battery unit 16a, which in particular has a different configuration from rechargeable battery unit 14a. Control electronics system 26a is provided for controlling energy transmission unit 18a in such a way that energy transmission unit 18a is provided for a continuous transmission of electrical energy at a charging power of approximately 36 W.

Furthermore, each of rechargeable battery units 14a, 16a is provided for making available at least one rechargeable battery parameter. In the present case, the rechargeable battery parameter corresponds, for example, to a QR code that is affixed to rechargeable battery housing 40a. Control electronics system 26a is provided for automatically setting the corresponding charging operating modes, in the present case in particular the first charging operating mode or the second charging operating mode, based on the rechargeable battery parameters of corresponding rechargeable battery unit 14a, 16a.

For this purpose, charging device 10a includes a detection unit 28a. Detection unit 28a has an operative connection with charging unit 12a. In the present case, detection unit 28a is integrated at least to a large extent into charging unit 12a, in particular charging housing 32a. In addition, detection unit 28a has an operative connection with control electronics system 26a. In the present case, detection unit 28a is configured as a laser scanner by way of example. Detection unit 28a is provided for detecting the particular rechargeable battery parameter, in the present case in particular the QR code. In addition, detection unit 28a is provided for transmitting to control electronics system 26a a detected rechargeable battery parameter for automatically setting the corresponding charging operating mode, as the result of which in particular operating reliability may be increased and operating convenience may be improved.

Alternatively, however, a rechargeable battery parameter could also be configured as an arbitrary rechargeable battery parameter that is different from a QR code, such as an identification signal that is provided by an RFID chip. In addition, a detection unit and/or at least one detection element of a detection unit could also be situated outside a charging housing, and in particular separate from a charging unit. In this case, for example, it is conceivable to integrate the detection unit and/or the detection element into a smart phone and/or to use a smart phone as a detection unit and/or as a detection element. In addition, it is conceivable to dispense with a detection unit entirely. In this case, for example, it is conceivable to use an additional manually operable input unit, such as a touch display, which may advantageously be integrated into a charging unit and/or a smart phone, and which may be used in particular for inputting a rechargeable battery parameter and/or for manually setting and/or selecting a charging operating mode.

Figure 3:
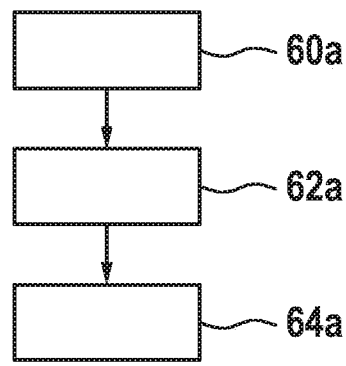
FIG. 3 shows an example of a flow chart of a method for operating the charging device.

FIG. 3 shows an example of a flow chart of a method for operating charging device 10a.

In the present case, the rechargeable battery parameter of a rechargeable battery unit 14a, 16a to be charged is ascertained in a first method step 60a.

One of the charging operating modes, in particular a charging operating mode associated with rechargeable battery unit 14a, 16a to be charged, is set in a method step 62a, based on the rechargeable battery parameters.

Corresponding rechargeable battery unit 14a, 16a is contactlessly charged with the aid of charging unit 12a in a method step 64a.

Figure 4:
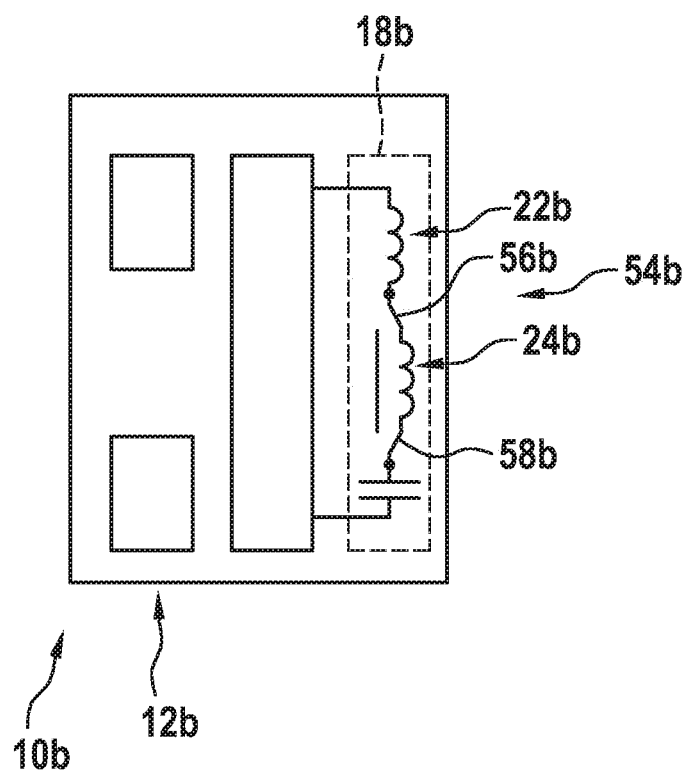
FIG. 4 shows another exemplary embodiment of a charging device in a schematic illustration.

FIG. 4 shows another exemplary embodiment of the present invention. The following description and the drawings are limited essentially to the differences between the exemplary embodiments; with regard to components that are denoted in the same way, in particular with regard to components having the same reference numerals, reference may basically be made to the drawings and/or the description of the other exemplary embodiment, in particular in FIGS. 1 through 3. To distinguish between the exemplary embodiments, the letter "a" is added as a suffix to the reference numerals of the exemplary embodiment in FIGS. 1 through 3. In the exemplary embodiment in FIG. 4, the letter "a" is replaced by the letter "b".

The further exemplary embodiment in FIG. 4 differs from the preceding exemplary embodiment at least essentially by the configuration of a charging unit 12b of a charging device 10b.

In this case, an energy transmission unit 18b of charging unit 12b includes multiple interconnectable coil elements 22b, 24b. Coil elements 22b, 24b are configured as switchable windings.

In addition, charging device 10b includes a switching unit 54b. Switching unit 54b includes two switching elements 56b, 58b by way of example, and is provided for individually connecting coil elements 22b, 24b.

In this case, energy transmission unit 18b is provided for making available at least two different charging powers, in particular with the aid of switchable coil elements 22b, 24b.

What is claimed is:

1. A charging device for a machine tool, comprising:
a charging unit configured to switch between (a) contactlessly charging at least one rechargeable battery unit, and (b) contactlessly charging at least one further rechargeable battery unit having a configuration different from the at least one rechargeable battery unit,
wherein the charging unit includes at least a first charging operating mode for transmitting electrical energy;
wherein the charging unit includes at least a second charging operating mode for transmitting electrical energy, and wherein the second charging operating mode differs from the first charging operating mode in at least one charging parameter,
wherein the charging parameter is a continuous energy transmission and/or an intermittent energy transmission
wherein the charging unit is configured to transmit energy continuously and intermittently to the at least one rechargeable battery unit.

2. The charging device of claim 1, wherein the charging parameter is a charging power.

3. The charging device of claim 1, wherein the charging unit includes at least one energy transmission unit for making available at least two different charging powers.

4. The charging device of claim 3, wherein the energy transmission unit includes at least one coil unit.

5. The charging device of claim 1, wherein the charging unit includes at least four different charging operating modes.

6. The charging device of claim 1, wherein the charging unit includes a control electronics system for setting one of the charging operating modes, based on at least one rechargeable battery parameter.

7. The charging device of claim 1, further comprising:
a detection unit for detecting at least one rechargeable battery parameter of a rechargeable battery unit to be charged.

8. A system, comprising:
a charging device for a machine tool, including:
a charging unit configured to switch between (a) contactlessly charging at least one rechargeable battery unit, and (b) contactlessly charging at least one further rechargeable battery unit having a configuration different from the at least one rechargeable battery unit,
wherein the charging unit includes at least a first charging operating mode for transmitting electrical energy;
wherein the charging unit includes at least a second charging operating mode for transmitting electrical energy, and wherein the second charging operating mode differs from the first charging operating mode in at least one charging parameter; and
at least one rechargeable battery unit for a contactless charging with the charging unit,
wherein the charging parameter is a continuous energy transmission and/or an intermittent energy transmission
wherein the charging unit is configured to transmit energy continuously and intermittently to the at least one rechargeable battery unit,
at least one further rechargeable battery unit having a configuration different from the rechargeable battery unit, and that is for a contactless charging with the charging unit.

9. A method for operating a charging device, the method comprising:
    setting a charging operating mode of at least two operating modes, based on at least one rechargeable battery parameter of at least one rechargeable battery unit; and
    contactlessly charging the at least one rechargeable battery unit with the charging unit,
    wherein the charging device, which is for a machine tool, includes:
    a charging unit configured to switch between (a) contactlessly charging at least one rechargeable battery unit, and (b) contactlessly charging at least one further rechargeable battery unit having a configuration different from the at least one rechargeable battery unit,
wherein the charging unit includes at least a first charging operating mode for transmitting electrical energy;
    wherein the charging unit includes at least a second charging operating mode for transmitting electrical energy, and wherein the second charging operating mode differs from the first charging operating mode in at least one charging parameter,
    wherein the charging parameter is a continuous energy transmission and/or an intermittent energy transmission
    wherein the charging unit is configured to transmit energy continuously and intermittently to the at least one rechargeable battery unit.

10. The charging device of claim 3, wherein the energy transmission unit includes at least one coil unit, which includes a broadband coil and/or multiple interconnectable coil elements.

* * * * *